US007314166B2

(12) United States Patent
Anderson et al.

(10) Patent No.: US 7,314,166 B2
(45) Date of Patent: Jan. 1, 2008

(54) SYSTEM AND METHOD FOR CALCULATING RECOMMENDED CHARGE LIMITS

(75) Inventors: Gordon Emory Anderson, Forest Hills, NY (US); Catherine J. Campanaro, Glendale, AZ (US); William Gaines Coomer, Phoenix, AZ (US); Michael Gregory James, Phoenix, AZ (US); Aniruddha V. Khandekar, Scottsdale, AZ (US); Sangarsh Nigam, Jersey City, NJ (US); Gary West, Greensboro, NC (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 10/907,477

(22) Filed: Apr. 1, 2005

(65) Prior Publication Data

US 2005/0279824 A1 Dec. 22, 2005

Related U.S. Application Data

(60) Provisional application No. 60/521,676, filed on Jun. 6, 2004.

(51) Int. Cl.
*G06K 5/00* (2006.01)
(52) U.S. Cl. .................................... 235/380
(58) Field of Classification Search ............... 235/380
See application file for complete search history.

(56) References Cited

U.S. PATENT DOCUMENTS 5,231,569 A * 7/1993 Myatt et al. ............... 705/38

| 5,914,472 | A | 6/1999 | Foladare et al. | |
|---|---|---|---|---|
| 6,029,154 | A * | 2/2000 | Pettitt ........................... | 705/44 |
| 6,125,349 | A | 9/2000 | Maher | |
| 6,173,269 | B1 | 1/2001 | Solokl et al. | |
| 6,343,279 | B1 | 1/2002 | Bissonette et al. | |
| 6,422,462 | B1 | 7/2002 | Cohen | |
| 6,529,725 | B1 | 3/2003 | Joao et al. | |
| 6,546,418 | B2 | 4/2003 | Schena et al. | |
| 2001/0051917 | A1* | 12/2001 | Bissonette et al. ........... | 705/39 |
| 2002/0069177 | A1 | 6/2002 | Carrott et al. | |
| 2002/0143647 | A1 | 10/2002 | Headings et al. | |
| 2002/0178071 | A1 | 11/2002 | Walker et al. | |
| 2002/0198806 | A1* | 12/2002 | Blagg et al. ................. | 705/35 |
| 2003/0009382 | A1 | 1/2003 | DArbeloff et al. | |
| 2003/0167227 | A1 | 9/2003 | Mellinger et al. | |
| 2003/0182247 | A1 | 9/2003 | Mobed et al. | |
| 2003/0195859 | A1 | 10/2003 | Lawrence | |
| 2003/0208439 | A1* | 11/2003 | Rast ............................ | 705/38 |
| 2005/0027667 | A1* | 2/2005 | Kroll ............................. | 707/1 |

* cited by examiner

*Primary Examiner*—Michael G. Lee
*Assistant Examiner*—Tae W. Kim
(74) *Attorney, Agent, or Firm*—Snell & Wilmer L.L.P.

(57) ABSTRACT

The invention facilitates the compilation of client-imposed charge or credit limit reports based on declined purchase and/or payment transactions. The invention provides a system and method by which an account manager for a financial institution and/or a client program administrator company may perform analysis of spending patterns for cardmembers in order to determine an optimal client-imposed credit limit in order to reduce the occurrences of declined charge or credit transactions. An account manager for a financial institution and/or a client program administrator may use the limits report to persuade a cardmember to increase the client-imposed credit limit to a recommended level, thereby reducing the cardmember's inconvenience cased by declined purchase transactions while recapturing lost revenues by the card issuer also resulting from declined purchase transactions.

18 Claims, 6 Drawing Sheets

Figure 6

SYSTEM AND METHOD FOR CALCULATING RECOMMENDED CHARGE LIMITS

CROSS-REFERENCE TO RELATED APPLICATION

This application claims priority to, and the benefit of, U.S. Provisional Application Ser. No. 60/521,676 filed Jun. 6, 2004 and entitled "Recommended Limits Report System and Method", which is hereby incorporated by reference.

FIELD OF INVENTION

The invention generally relates to identifying cardmembers who regularly exceed their spending limits, and more particularly, to a system and method for producing a report and analysis to help reclaim declined transactions, reduce risk, reduce point of sale (POS) declines and increase cardmember satisfaction and charge volume.

BACKGROUND OF INVENTION

Over the years, financial institutions, which typically provide loans and/or lines of credit to individuals and/or business entities, have developed sophisticated systems to manage risk. Models and mathematical formulas have long been tools of the industry for developing an approximation of risk when evaluating customers in consideration for loans and/or lines of credit. Credit reporting agencies such as Experian, Equifax and TransUnion provide financial institutions with reports reflecting an individual's or business' historical payment data. A credit report is usually the first consideration in evaluating a customer's credit worthiness and most often is the determining factor in whether a loan is issued or a line of credit with a credit limit is issued.

Other considerations exist for a financial institution to use in addition to a credit report to determine if a customer is able and/or likely to repay a loan and/or money borrowed against a line of credit. The income of a borrower or the fiscal health of a business, along with the financial obligations of the borrowing entity, are often considered in conjunction with the credit report in calculating a level of certainty that a loan will not go unpaid.

Financial institutions occasionally reevaluate a customer's payment history when determining whether to increase a customer's credit limit. Sometimes this is completed at a customer's request, at other times, it is completed to encourage customer loyalty and maximize profit by encouraging reliable customers to borrow more. However, some providers of corporate lines of credit providers allow their client's to place individual limits on corporate cards issued to employees. For example, a cardmember may be eligible for a $20,000 line of credit; however the client may choose to place a self-imposed credit limit at $10,000. Clients may find this desirable to help manage debt and to control spending when corporate cards are issued to employees for business related expenses.

Cardmembers who would otherwise qualify for a higher credit limit, but yet have applied a lower client-imposed credit limit, may encounter declined purchases because they have reached such limit. A client is a corporate or organizational entity that issues corporate credit cards to internal cardmembers. When such cardmember is declined at the point of sale, they are often not aware that it is due to, for example, a client-imposed limit that has been set by a program administrator within the corporation. A declined cardmember may therefore assume that a problem exists with the issuer. Declines often result in embarrassment and/or inconvenience for the cardmember, and lost customer loyalty to the issuer. Declines due to client-imposed limits also may represent a loss in possible revenue to the issuer of a credit line. Within the United States alone, one financial card company may have over $800 MM in limits-based declines which translates to lost revenue and/or substantial customer dissatisfaction.

Therefore, a need exists for a system and method for creating recommended limit reports that can be provided to program administrators who may choose to share the information with their cardmember clients. A limits report providing statistics and analysis regarding a cardmembers spending patterns may be used by an account manager and/or program administrator to encourage the client to raise their client-imposed credit limit to a level sufficient to reduce declines, while maintaining their debt management goals.

SUMMARY OF THE INVENTION

The present invention provides program administrators (who may work for Corporate Card clients) the ability to select a period of time (e.g., previous 3, 6, 9, or 12 months) to identify cardmembers who regularly exceed their spending limits (e.g., monthly, by transaction, etc.). Cardmembers may also request similar reports directly. The resulting report provides an analysis of attempted cardmember spend patterns, and when appropriate, recommends optimum transaction and/or monthly limits to better meet the needs of cardmembers. Report analysis may be based on all attempted card transactions after, for example, duplicate charge attempts have been identified and removed from the data analysis. These recommended limits may be applied to transaction card accounts. The analysis and reporting functions may also interface with and/or share data with any loyalty systems and loyalty point databases.

The invention may be supplemented by, for example, a default 10% variance for all future monthly and transaction limits that are set in OPM (Online Program Management). The card issuer may also send various data to specific high-decline-rate clients to show them their decline problem and encourage them to raise their self-imposed limits.

A recommended limits report may be an important tool in reclaiming many of the declined transactions. The report may also reduce POS declines and greatly increase cardmember satisfaction and charge volume. The report helps to manage risk through appropriate spending limits by identifying appropriate transaction and/or monthly limits for cardmembers who regularly exceed their limits while attempting to perform their job duties. The invention is a self-service information tool that client Managers of Account Development (MAD) or Program Administrators (PA) can run as desired. The users may also use the tool to become better aware of the transaction patterns of individual cardmembers and attempt to predict cardmembers' real business needs. Moreover, by reducing limits-based issues, declines are lowered and merchant satisfaction increases.

The invention may determine transaction limits by retrieving transaction information of an existing cardmember; and, analyzing transaction information to determine a recommendation, wherein the recommendation relates to a transaction limit for minimizing authorization declines on a transaction account. The invention may also produce a report and an analysis at a predetermined interval. Developing the report may include retrieving a parameter; retrieving data from a database according to the parameter; removing duplicate entries from the data; processing the data according to the parameter; and, formatting the data according to the parameter.

BRIEF DESCRIPTION OF THE DRAWINGS

A more complete understanding of the present invention may be derived by referring to the detailed description and claims when considered in connection with the Figures, wherein like reference numbers refer to similar elements throughout the Figures, and:

DETAILED DESCRIPTION

Figure 1:
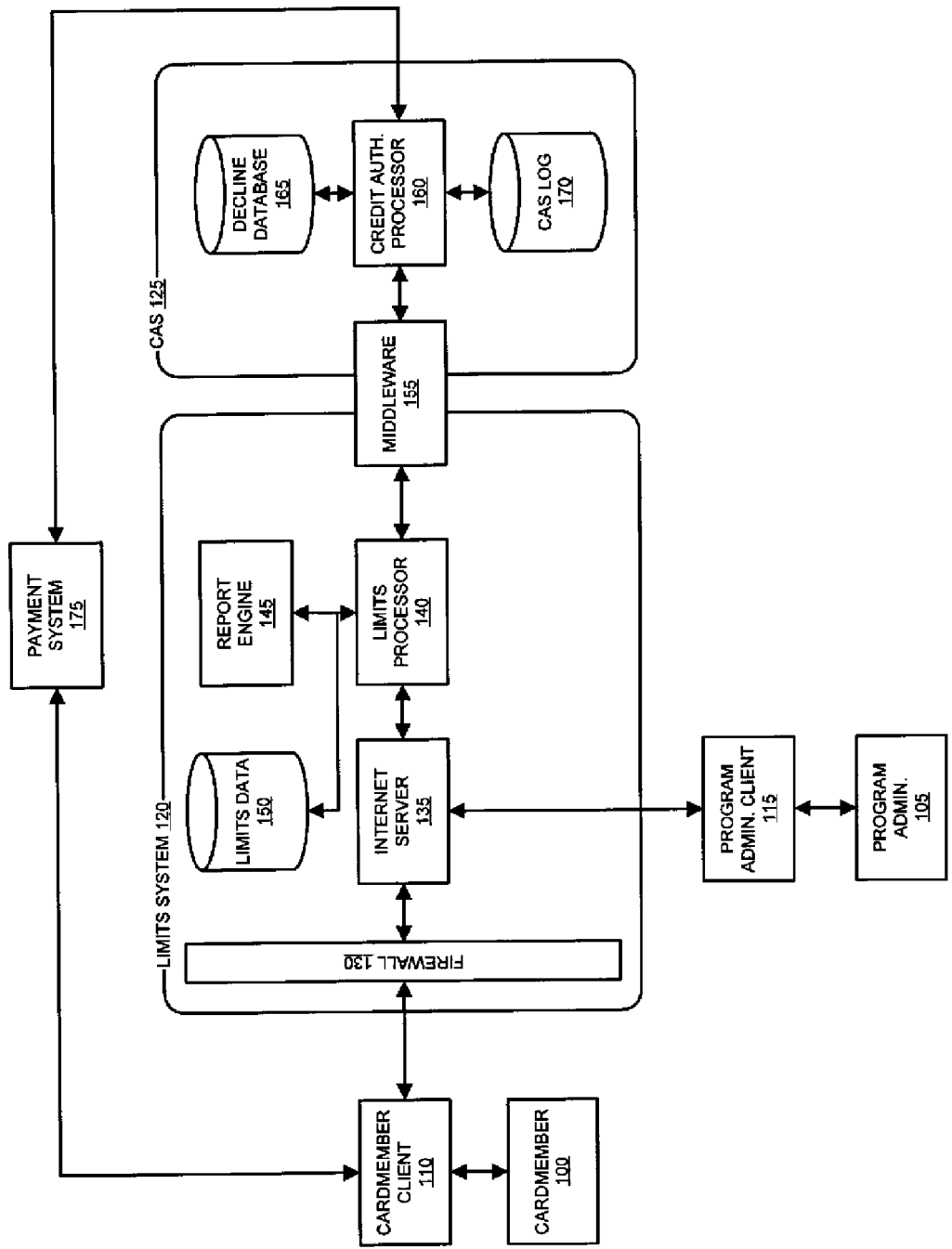
FIG. 1 is a block diagram illustrating exemplary major system components for producing limits reports which provide an analysis based on cardmember spending patterns.

The detailed description of exemplary embodiments herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

In general, the invention includes a system and method for generating recommended limits reports. The reports reveal, for example, cardmember spending patterns and provide analysis regarding client-imposed spending limits. The invention enables a cardmember 100 and/or program administrator 105 to invoke a limits system 120 in order to generate a limits report. The invention may be incorporated into or used in association with any financial management system such as, for example, U.S. patent application Ser. No. 10/709,703, entitled "Pay Yourself First" filed on May 24, 2004, and U.S. patent application Ser. No. 10/906,210, entitled "System and Method for Calculating Expected Approval Rates" filed on Feb. 9, 2005, which are hereby incorporated by reference. Any portion or process of the invention may also incorporate the issuance or redemption of loyalty points or any other incentive function.

The limits system 120 contains various hardware and/or software components suitably configured to compile limits reports containing analysis of spending patterns and, when appropriate, recommending changes to spending limits based on the frequency and nature of one or more declines. In one embodiment, with reference to FIG. 1, the limits system 120 includes a firewall 130, an Internet server 135, limits processor 140, report engine 145, limits data 150 and middleware 155. External entities may include a cardmember 100, cardmember client 110, program administrator 105, program administrator client 115, payment system 175 and a card authorization system (CAS) 125. A CAS 125 may contain a credit authorization processor 160, decline database 165 and CAS log 170 among other data, hardware and/or software components.

As will be appreciated by one of ordinary skill in the art, the present invention may be embodied as a customization of an existing system, an add-on product, upgraded software, a stand alone system (e.g., kiosk), a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Referring now to FIG. 1, a cardmember client 110 and a program administrator client 115 may connect with a limits processor 140 either directly or indirectly. In one embodiment, a cardmember client 110 may connect to a limits processor 140 through an Internet server 135. Internet server 135 may include any hardware and/or software suitably configured to facilitate transactions between a cardmember client 110 and a limits processor 140. Internet server 135 may operate as a single entity in a single geographic location or as separate computing components located together or in separate geographic locations. Further, Internet server 135 may be an intranet server or may send, receive and process data via a network both to and from one or more Internet servers.

A cardmember 100 may include any individual, business, entity, software and/or hardware that participates in, for example, a revolving line of credit service such as those offered by American Express, Visa, MasterCard, Discover, Diners Club and the like. A card member 100 may be provided a credit instrument such as a magnetic stripe card, smartcard or fob transponder for facilitating purchase transactions, however this is not necessary. Cardmember 100 may interact with a limits system 120 in order to request, view and/or print the limits reports of the present invention through a cardmember client 110.

A cardmember client 110 may include any software and/or hardware that facilitate communications and/or transactions between a cardmember 100 and the Internet server 135. A cardmember client 110 may interface with an Internet server 135 via an Internet browser connected to the Internet using standard dial-up, cable, DSL or any other Internet protocol known in the art. Further, cardmember client 110 may interface with an Internet server 135 via any device or method discussed herein or known in the art. In one embodiment, a cardmember client 110 may interface directly with the limits processor 140 via a secure protocol such as a local area network (LAN), wide area network (WAN), intranet, extranet, and the like.

In order to restrict unauthorized access to the components of the limits system 120, a firewall 130 may be employed and Internet connections may first pass through a firewall 130 before connecting with the Internet server 135. Firewall 130 may include any hardware and/or software suitably configured to protect limits system 120 components from users of other networks and provide limited or restricted access to cardmember clients 110 accessing a limits processor through an Internet connection. Firewall 130 may reside in varying configurations including Stateful Inspection, Proxy based and Packet Filtering among others. Firewall 130 may be integrated within an Internet server 135, any other limits system 120 components or may reside as a separate entity.

A program administrator 105 may include any individual, business, entity, software and/or hardware that manages one or more service offerings of a financial institution on behalf of an organization. The program administrator 105 may be an employee of a corporation who is responsible for managing a corporate line of credit as well as interfacing with limits processor 140 to manage client-imposed credit limits for individual employee cardmembers. In another embodiment, the program administrator 105 may be a representative of the issuer who works with a corporate client to manage a corporate line of credit and/or other financial products. In yet another environment, the program administrator 105 may be a trusted third-party such as, for example, an advisor or consultant to the corporate client. The program administrator 105 may connect to and interact with a limits processor 140 through a program administrator client 115. In another embodiment, a program administrator 105 may interact with a limits processor 140 directly.

A program administrator client 115 may connect with a limits processor 140 through an interface with an Internet server 135 via an Internet browser connected to the Internet using standard dial-up, cable, DSL or any other Internet protocol known in the art. Further, program administrator client 115 may interface with Internet server 135 via any device or method discussed herein or known in the art. A program administrator client 115 may connect directly with the Internet server 135 over a secure connection, or may connect through a firewall 130. In one embodiment, a program administrator 115 may interface directly with the limits processor 140 via a secure protocol such as a local area network (LAN), wide area network (WAN), intranet, extranet, and the like.

A program administrator client 115 and a cardmember client may comprise computing units or systems which may take the form of a computer or set of computers, although other types of computing units or systems may be used, including laptops, notebooks, hand held computers, set-top boxes, workstations, computer-servers, main frame computers, mini-computers, PC servers, network sets of computers, and/or the like. Further, any computing device discussed herein may also be a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

A limits processor 140 may include any hardware and/or software suitably configured to process requests from the various components of the present invention in order to facilitate the compilation and delivery of limits reports to program administrators 105 and/or cardmembers 100. A limits processor 140 may receive requests from an Internet server 135 serving as a liaison between a cardmember client 110 and the limits processor 140. Limits processor 140 may also receive requests from a program administrator client 115. Requests received at the limits processor 140 may initiate a request for data from a limits database 150.

Limits database 150 may include any hardware and/or software suitably configured to facilitate storing report data and/or historical data which may be used to analyze trends relating to a cardmembers 100 spending patterns. Further, limits database 150 may comprise any information which may be used to identify cardmembers 100, user credentials, credit accounts, transaction records and the like. For simplicity, limits database 150 is illustrated and described herein as a single database. One skilled in the art will appreciate that the limits system 120 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first issuer, a second data set which may be stored may be provided by an unrelated second issuer, and yet a third data set which may be stored, may be provided by an third issuer unrelated to the first and second issuer. Each of these three exemplary data sets may contain different information that is stored using different data storage formats and/or techniques. Further, each data set may contain subsets of data which also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, provider, issuer, user or the like. Furthermore, the security information may restrict/permit only certain actions such as accessing, modifying, and/or deleting data sets. In one example, the data set annotation indicates that only the data set owner or the user are permitted to delete a data set, various identified providers are permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The present invention may contemplate a data storage arrangement wherein the header or trailer, or header or trailer history, of the data is stored on the transaction instrument in relation to the appropriate data.

Limits processor 140 may transmit requests for data to a card authorization system (CAS) 125. A request for data from one or more CAS 125 databases may include any information relevant to a cardmember's 100 credit account, trends, transactional history and declines. CAS 125 may include any hardware and/or software suitably configured to process credit transactions between a cardmember 100 and a merchant's payment system 175. CAS 125 may contain one or more databases which store information relating to cardmember's 100 credit account and may include, for example, authentication credentials, billing information, credit limits, transactional data and the like. Specifically, a CAS 125 may contain a CAS log 170 which may store all transaction data including both approved and declined transactions. When a credit authorization processor 160 receives a request to authorize a purchase transaction, the results of the request along with information such as transaction time, merchant ID, purchase amount, etc., may be transmitted to the CAS log 170 where it may be stored. Additionally, decline database 165 may store all transactional data specific to transaction declines. For example, when a cardmember who has exceeded his monthly client-imposed credit limit attempts to make a purchase using his corporate credit card, the transaction will be declined by the credit authorization processor 160 which may then transmit the transaction information to the decline database 165 to be stored. In another embodiment, the decline database 165 may be populated with decline transactional information periodically, rather than at the time the transaction is declined. For example, a CAS 125 process may run at predetermined intervals in order to identify and copy declined transaction details from the CAS log 170 to the decline database 165. Both the decline database 165 and the CAS log 170 may provide relevant information to the invention in the compilation of limits reports and the analysis thereof.

The hardware and software components of a CAS 125 are known in the art as they are employed by various credit line providers in order to perform payment authorizations and processing of purchase transactions. For simplicity, the CAS 125 of the present invention is described as comprising a credit authorization processor 160 for processing payment requests from a payment system 175, a decline database 165 for storing information relating to a cardmember's 100 declined credit transactions and a CAS log 170 for storing cardmember's 100 transactional data. Those skilled in the art will appreciate that a CAS 125 may comprise any number of hardware and/or software components in any number of configurations.

To facilitate communications between a limits processor 140 and a credit authorization processor 160, middleware 155 may be employed to process and format transactions in order to be suitably received by either of the two systems. For example, a limits processor 140 of the present invention may comprise a host computing system employing a Windows operating system. The credit authorization processor 160, alternatively, may comprise a mainframe employing a UNIX operating system. In order to suitably exchange requests between the two disparate computing systems, a middleware 155 component may first receive and format a request in order that it may be suitable received and processed by the other system. Middleware 155 components are commercially available and known in the art. Middleware 155 may be implemented through commercially available hardware and/or software, through custom hardware and/or software components, or through a combination thereof. Further middleware 155 may reside in a variety of configurations and may exist as a standalone system or may be a software component residing on the limits processor 140.

Following receipt of cardmember 100 information resulting from a request to the one or more databases of the limits system 120 and/or CAS 125, limits processor 140 may process and transmit cardmember 100 information to a report engine 145. Report engine 135 may include any hardware and/or software suitably configured to produce reports from information stored in one or more databases. Report engines 145 are commercially available and known in the art. Report engine 135 may provide printed reports, web access to reports, graphs, real-time information, raw data, batch information and/or the like. The report engine 145 may be implemented through commercially available hardware and/or software, through custom hardware and/or software components, or through a combination thereof. Further, report engine 145 may reside as a standalone system within a limits system 120 or as a component of the limits processor 140. In one embodiment, report engine 145 may be configured to process requests from a limits processor 140 to query a limits database 150, databases within a CAS 125, or a combination thereof. Data received from a limits processor 140 and/or one or more database queries may be formatted by the report engine 145 and transmitted to a limits processor 140. Limits processor 140 may transmit formatted reports to a program administrator client 115 via an Internet server 135, or alternatively, to a requesting cardmember client 110.

The various system components discussed herein may include one or more of the following: a server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. Various databases used herein may include: user data, debt data, income data, provider data; financial institution data; and/or like data useful in the operation of the present invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. user computer can be in a home or business environment with access to a network. In an exemplary embodiment, access is through a network or the Internet through a commercially-available web-browser software package.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Provider (ISP) over the local loop as is typically used in connection with standard modem communication, cable modem, Dish networks, ISDN, Digital Subscriber Line (DSL), or various wireless communication methods. See, e.g., GILBERT HELD, UNDERSTANDING DATA COMMUNICATIONS (1996), hereby incorporated by reference. It is noted that the network may be implemented as other types of networks, such as an interactive television (ITV) network. Moreover, the system contemplates the use, sale or distribution of any goods, services or information over any network having similar functionality described herein.

The computers discussed herein may provide a suitable website or other Internet-based graphical user interface which is accessible by users, hosts or operators of the system. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service which receives a request from a web server, the request including a URL (http://yahoo.com/stockquotes/ge) and an IP address (123.56.789). The web server retrieves the appropriate web pages and sends the data or applications for the web pages to the IP address. Web services are applications which are capable of interacting with other applications over a communications means, such as the Internet. Web services are typically based on standards or protocols such as XML, SOAP, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated herein by reference.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

Each participant in the present invention may be equipped with a computing device in order to interact with the system and facilitate compilation of limits reports. The cardmember 100 and program administrator 105 may each have a computing unit in the form of a personal computer, although other types of computing units may be used including laptops, notebooks, hand held computers, set-top boxes, cellular telephones, touch-tone telephones and the like. In one embodiment, the program administrator may have a computing unit implemented in the form of a computer-server, although other implementations are contemplated by the invention. The credit line provider has a computing center shown as a server. However, the credit line provider computing center may be implemented in other forms, such as a mini-computer, a PC server, a network of computers located in the same of different geographic locations, or the like. Moreover, the system contemplates the use, sale or distribution of any services or information over any network having similar functionality described herein These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Referring now to FIGS. 2-5, the process flows depicted are merely exemplary embodiments of the invention and are not intended to limit the scope of the invention as described herein. For example, the steps recited in any of the method or process descriptions may be executed in any order and are not limited to the order presented. It will be appreciated that the following description makes appropriate reference to not only to the steps depicted in FIGS. 2-5, but also to the various system components as described above with reference to FIG. 1. Further, illustrations of the process flows and the descriptions thereof make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Frequent mention is made herein to "client-imposed" credit limits. Those skilled in the art will appreciate that the present invention may also be used to produce limits reports and analysis regarding limits imposed by card issuers or any other person or entity. For example, the present invention may be useful in providing an analysis of an optimal credit limit for cardmembers based on transaction declines. This information may be used in conjunction with other information such as, the cardmember's credit worthiness, repayment history, amount of time client has remained in good standing and the like. Additionally, the present invention may be configured to retrieve such data and incorporate it into the analysis provided by the limits report.

Figure 2:
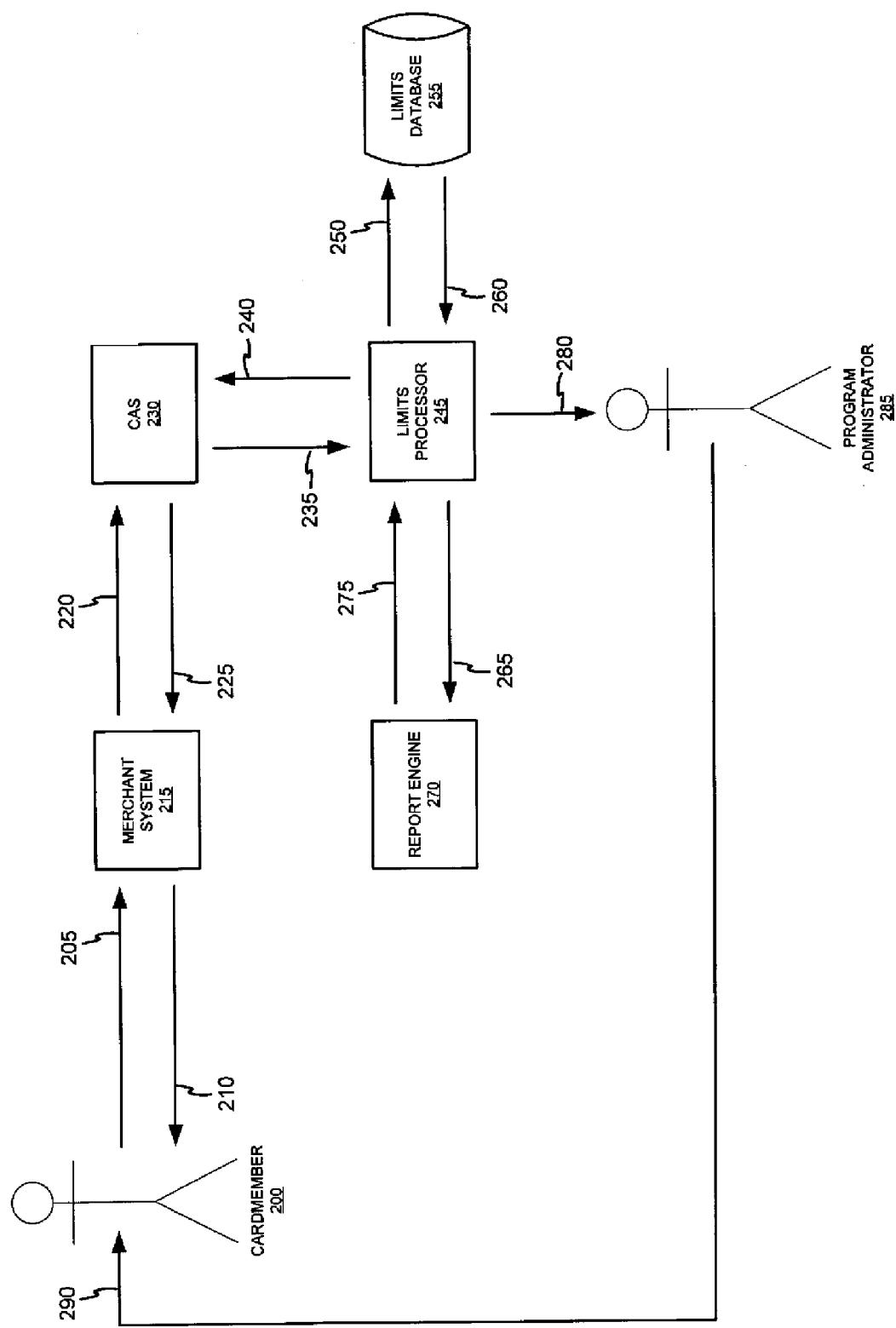
FIG. 2 is a combination flow chart/system diagram illustrating a high-level view of an exemplary system and method producing limits reports.

FIG. 2 presents a high level diagram illustrating the flow of data for an exemplary embodiment. Cardmember's 200 credit instrument credentials, such as a card number, magnetic stripe, smartcard code, personal identification number (PIN) and the like, may be transmitted (step 205) to a merchant system 215. On receipts of credit instrument credentials, merchant system 215 may transmit cardmember credentials (step 230) to a CAS 230 for the issuing entity. After validating cardmember 200 credentials, CAS 230 may verify that the purchase amount does not exceed cardmember's 200 available line of credit balance and/or allowable overdraft. If the purchase amount is within cardmember's 200 available line of credit balance then an authorization may be transmitted (step 225) to the merchant system 215 and the sale may be consummated. However, if the purchase amount exceeds an available line of credit balance for the cardmember 200 then a decline message may be transmitted (step 225) to the merchant system 215 and merchant or merchant system 215 may notify cardmember 200 that his or her credit instrument was declined (step 210).

In one embodiment, CAS 230 may transmit a decline message (step 225) to merchant system 215 and also transmit the decline message (step 235) or any other credit, demographic or financial information to a limits processor 245. Limits processor 245 may be configured to initiate a lookup procedure to determine if cardmember 200 has been previously declined over a defined period of time. For example, limits processor 245 may be configured to compile a limits report upon receipt of a third decline message within a thirty day period. This may enable a program administrator 285 to issue or use the limits report to persuade cardmember 200 to increase his or her client-imposed credit limit while the decline is fresh on cardmember's 200 mind. The system may also enable an override of the rejection based on a recommendation of the limits report, an algorithm and/or rule.

In another embodiment, limits processor 245 may transmit a request (step 240) to CAS 230 upon being prompted to compile a limits report. A program administrator 285 may request a limits report from limits processor. Upon receipt of the request, limits processor 245 may transmit a request (step 240) to the decline database 165 for decline data (including any other financial and/or credit data). Decline database 165 may contain any number of data points and the limits processor 245, based on limit report requirements, may request data containing all data points, or a subset thereof. Limits processor 245 may use program administrator 285 and/or cardmember 200 supplied parameters to request data falling within certain parameters. For example, a program administrator 285 requesting a limits report may define parameters such as a start and end date for the data sample, one or more cardmembers to include in the report, number of declines, declines of a defined currency amount and the like. Limits processor 245 may configure a request based on supplied parameters to retrieve only data from CAS 230 falling within the parameter range.

Limits processor 245 may also transmit a request (step 250) to a limits database 255. Limits database 255 may store information relating to prior limits reports. Such information may be useful for further analysis of cardmember's 200 spending history by combining historic limits report data with more recent CAS 230 data. Limits database 255 may also store saved parameters so that a program administrator 285 and/or cardmember 200 may request limits reports based on saved parameter data. For example, a program administrator 285 may define parameters in order to request a limits report for all cardmembers 200 participating in Program A. The program administrator 285 may also indicate that the limits report should contain decline information for the 60 days prior to the limits report date. Further, program administrator 285 may define parameters indicating that declines exceeding $50.00 should be included in the limits report. Alternatively, program administrator 285 may define a variance such as, for example, to only include declines that exceed 10% of the cardmember's 200 total credit limit.

Limits processor 245 may transmit CAS 230 decline database information and limits database 255 historic and/or parameter data (step 265) to a report engine 270. Report engine 270 may process parameter data and decline information in order to compile a limits report. Those skilled in the art will appreciate that report engine 270 may contain logic for performing transactional and monthly limit analysis of data as well as formatting data to compile into a limits report. However, analysis logic may preferably reside within a limits processor 245. Transactional limit analysis may include suggested limits calculated from data representing a defined period of time, a total number of declined transactions, a number of declined transactions by month, a number of months in a defined period where declines where recorded, an average transaction amount, a maximum transaction amount, a proposed monthly limit, etc.

Monthly limit analysis may include the number of months where transactions exceeded the limit, average amount of transactions exceeding the limit, and a maximum of spend during the defined period of time. A proposed monthly limit calculation enables a program administrator 285 to recommend a new monthly limit to reduce the number of transactions in excess of the limit. The proposed monthly limit is derived by the following calculation: Monthly Limit+(Multiplier*(Average Spend−Monthly Limit). The multiplier is used to create a threshold in the calculation in order to provide a degree of cushion in the proposed monthly limit. To use this calculation within an example, assume that a cardmember's current monthly limit is $3,000 and the average monthly spend over a period of six months is $3,300 and the multiplier is 1.25. Therefore, the following equation may be constructed to calculate a proposed monthly limit: 3,000+(1.25*(3,300−3,000)=3,375.

Further, report analysis may include links to transaction records associated with declined transactions which, if selected, may present the program administrator 285 with a corresponding transaction record. A transaction record may provide a more detailed view into the transaction such as the date and time of the transaction, an identification of the merchant, and product or service details.

In addition to decline data analysis information, a compiled limits report may contain information such as, for example, account number, account holder, cost center, corporate information, current monthly limit, current transaction limit, and the like. A compiled limits report may be transmitted (step 275) from the report engine 270 to limits processor 245. Limits processor 245 may transmit the limits report (step 250) to a limits database 255 which may store the limits report and/or report data. Limits processor 245 may also transmit a limits report (step 280) to the requesting program administrator 285. Those skilled in the art will appreciate that a limits report may be transmitted to a program administrator 285 through any means known in the art such as, for example, to a computer terminal, web page, printer, email, fax, postal service, etc. In addition to transmitting a limits report to a program administrator 285, a limits report may also be transmitted to a cardmember 200 or any designated third party.

A program administrator 285 may provide the limits report (step 290) to a cardmember 200 or provide additional analysis of the limits report and use information contained in the report to determine if a cardmember 200 should be contacted (via any known means or other means described herein) regarding recommended modification of a client-imposed credit limit.

In another embodiment, a cardmember 200 may request that a limits report be provided on a reoccurring basis or upon certain rules (e.g., over 3 declines per week) for their review. Further, a program administrator 285 may request that a limits report be run on a reoccurring basis and define additional parameters to limits processor 245 to indicate that only reports meeting certain criteria should be provided to the program administrator 285, cardmember 200 and/or designated third-parties.

Figure 3:
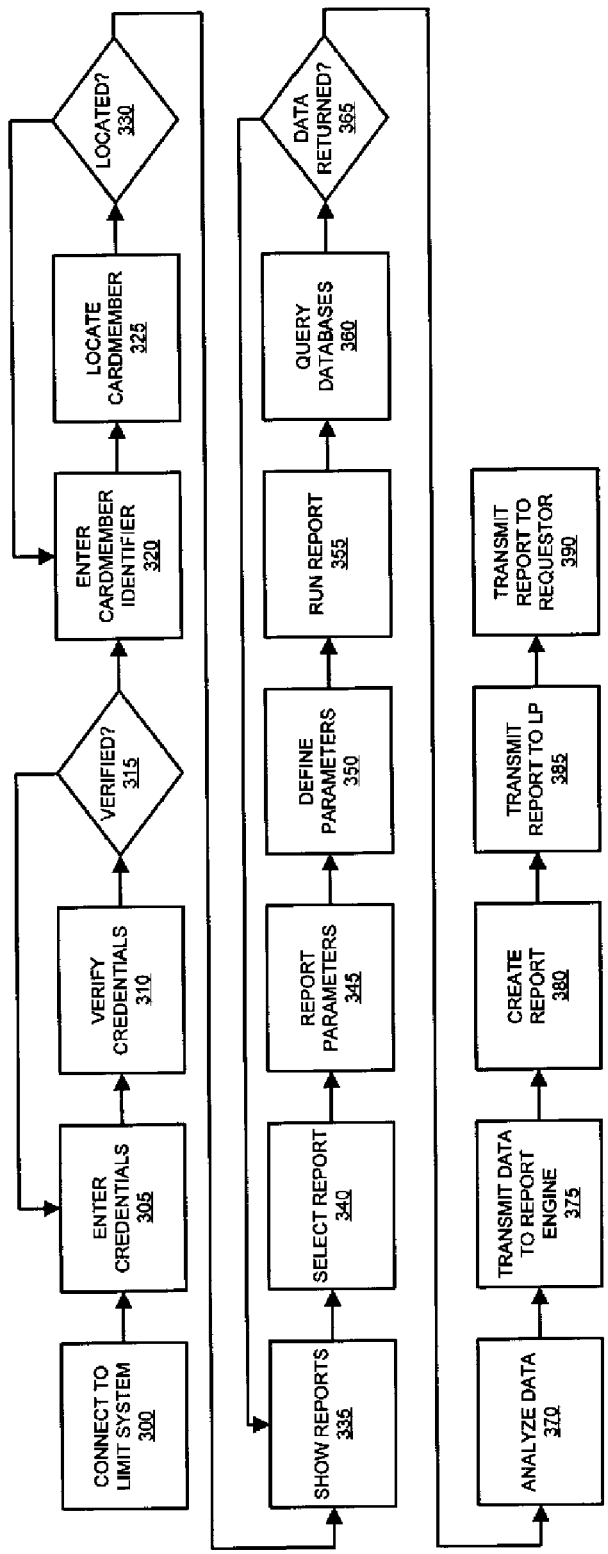
FIG. 3 is a flow chart illustrating an exemplary method for executing a request for a limits report.

FIG. 3 provides a more detailed process flow for an exemplary system for producing limits reports. A program administrator 105, cardmember 110 and/or designated third-party may connect to a limit system 120 in order to request one or more limits reports. As used herein in reference to FIG. 3, any entity connecting and interfacing with a limits system 120 will be referred to as a "user". A user may connect to a limits system (step 300) through a any means known in the art and as discussed in reference to FIG. 1.

When connected to a limits system 120, a user may be prompted to enter credentials (step 305). Credentials may include a user ID and/or password in order to ensure that a connecting user is authorized to access the limits system 120. Practitioners will appreciate that there are a number of methods known in the art for restricting access to a computerized system.

Credentials entered in step 305 may be transmitted to a limits system 120 where they may be verified (step 310). If the credentials are not verified (step 315) the user may be prompted to again enter credentials (step 305). When credentials are verified (step 315) then user may be directed to enter card member identifier (step 320) which may comprise a card member's name, identification number, account number, card number and the like. In another embodiment, a program administrator 105 may enter a program identifier or demographic data in lieu of cardmember identifier (step 320) in order locate cardmembers (step 325) matching the defined criteria. For example, a limits system 120 may provide a program administrator 105 a list of one or more financial programs which are offered to cardmembers 100 by his or her bank or financial institution. The program administrator 105 may select one or more programs, and limits system 120 may return cardmember identifiers for all participants of the selected program(s). In another example, a program administrator 105 may define demographic parameters such as cardmember 100 age ranges, income brackets, credit limits, spending patters and the like. A limits system 120 may then return only those cardmember identifiers that match the defined demographic parameters.

When a cardmember identifier has been entered, the identifier may be transmitted to a limits processor 140. Limits processor may send a request to a CAS 125 in order to located the cardmember (step 325). If CAS 125 is unable to locate a cardmember (step 330) based on the supplied cardmember identifier, then the user may again be prompted to enter cardmember identifier (step 320). If CAS 125 does locate a cardmember (step 330) based on the supplied cardmember identifier, then user may be presented a list of one or more limits report types (225). A limits system 120 may provide one or more limit report types representing variances in how limits report information is to be formatted, how information should be analyzed, how the report should be delivered and the like. A user may select the report type (step 340) and then based on the selection, the user may be presented with various report parameters (step 345). A user may define report parameters (step 350) which may include, for example, a date range, which declined transactions to include or exclude from the report, analysis parameters, specific industry codes, weighting values, and the like. After defining parameters (step 350), the user may select to run a limits report (step 355). Defining parameters will be discussed in greater detail in reference to FIG. 4.

When limits processor 140 receives a request to run a report, limits processor 140 may construct one or more queries based on the report selection (step 340) and defined parameters (step 350). Limits processor 140 may transmit queries to a limits database 150, a CAS decline database 165, CAS log 170 or a combination thereof (step 360). Data from the one or more databases may be used in the compilation of the limits report. If no data is returned (step 365) indicating that there are no database records matching the report criteria, the user may be alerted and again presented with a list of report types (step 335). The user may select a different report (step 340) and/or redefine parameters (step 350). If data is returned (step 365) resulting from one or more issued database queries, then limits processor 140 may apply logic to analyze the data. For example, a program administrator 105 may have defined parameters (step 350) to affect the analysis of data for a limits report. The program administrator 105, system or any other user may have placed varying weights on different types of declined transactions. According to the specific type of information that is desirable to the program administrator 105, a declined online purchase transaction may be weighted more heavily than a declined "card present" transaction.

According to the analysis of data returned from the one or more queried databases, limits processor 140 may next transmit the data along with a request for a report type and defined report parameters to a report engine (step 375). Report engine may create a limits report (step 380) and transmit the report to the limits processor (step 385). The limits report may then be transmitted or delivered to the program administrator 105, cardmember 100 and/or designated third-party.

Figure 4:
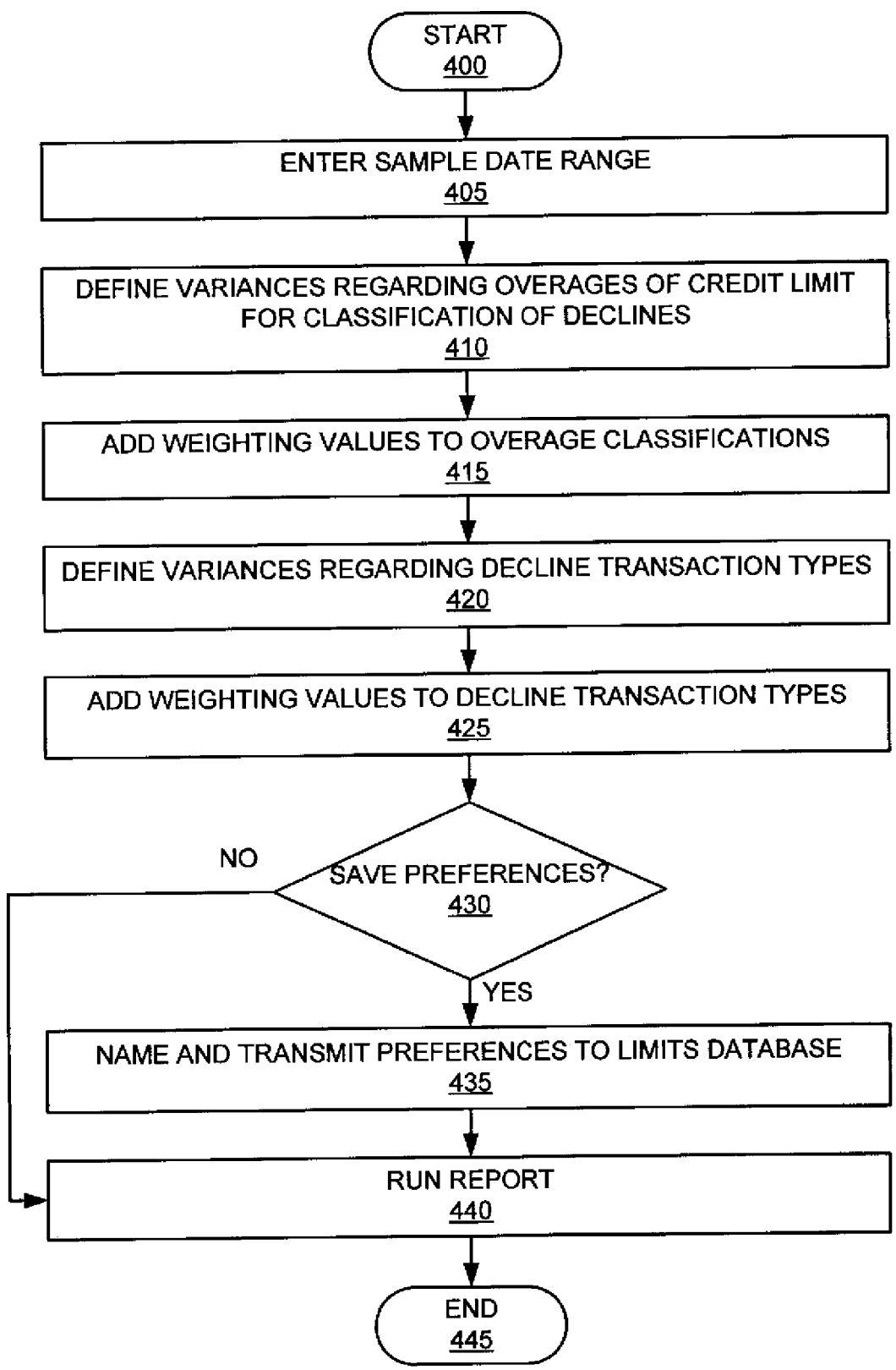
FIG. 4 is a flow chart illustrating an exemplary method for defining report analysis parameters.

FIG. 4 is a flow chart illustrating an exemplary method for defining report analysis parameters. Step 400 is a start state, which corresponds to the initiation of the parameter definition process. In reference to FIG. 4, any entity defining analysis parameters, which may include a program administrator 105, a cardmember 100, a designated third party and the like, will herein be referred to as a user.

A user may first be prompted to enter a date range (step 405) for the data sample. Specifically, a user may be prompted to enter a transaction start date and a transaction end date. The date range may be used by the limits processor 140 in order to request only those records corresponding to declined transactions which occurred between a start date and an end date. In an alternative embodiment, a user may define a number of days, weeks or months subsequent to the report date for which to request decline transactions.

Next, a user may be prompted to define variances regarding overages of credit limit for classification of declines (step 410). In other words, a user may create classes for which to group declined transactions based upon how much a purchase transaction request exceeded a credit limit. For example, a user may create one class for transaction requests exceeding 5% of a cardmember's total credit limit. The user may create an additional class for those that exceeded 10% of a cardmember's total credit limit. Such classifications may be important in analyzing and prioritizing cardmember notification and calculating a recommended client-imposed limit on a line of credit.

Following the creation of overage classes, a user may add weighting values to each class (step 415). Those skilled in the art will appreciate that there are a number of methods for applying weighting when performing computerized and statistical analysis of data. Weighting one class with a higher number than another class may enable limits processor 140 to provide more meaningful and accurate analysis. Weighting is useful when analyzing data from different perspectives. In other words, when there are multiple considerations that can be made in evaluating data, weighting can prove to be an effective and useful tool.

A user may also define variances regarding decline transaction types (step 420). Classification of transaction types where a purchase transaction was declined due to a client-imposed credit limit can be important in analyzing a cardmember's 100 spending habits. For example, a user may choose to define a class for online purchase transactions, a class for ATM cash withdrawals and a class for "card present" merchant transactions. A user can then assign weighting values to the various defined decline transaction types (step 425). As discussed above, weighting can provide a more accurate representation of data when multiple levels of data exist. According to the previous example, a user may assign declined ATM withdrawal transactions a weight of 8, an online purchase transaction a weight of 4, and a merchant transaction a weight of 12. The varying weights may be indicative of the level of inconvenience and/or embarrassment a cardmember 100 may have experienced as a result of the various declined transactions. Further, a user may select one or more industry codes indicative of the types of industries the user would like to include in the report. In one embodiment, report entries regarding declined transactions may be grouped and analyzed according to their industry code.

When a user has completed the parameter definition process, the user may be prompted on whether to save the parameters (step 430). Saving parameters may be useful when a user frequently requests limits reports based on previously defined parameters. Rather that redefining parameters every time a limits report is requested, a user may select from a list of previously saved parameters. If a user chooses to save the parameters, the user may be prompted to enter a name and/or description of the parameter set prior to transmitting the preferences to a limits database 150 where it will be stored (step 435). Finally, a user may invoke a limits processor to execute and compile a limits report (step 440). When the limits report has been produced and transmitted to the user, the process may be complete (step 445).

While the steps as recited above and illustrated in FIG. 4 provide a sample process flow for an exemplary embodiment of a parameter definition process, practitioners will appreciate the steps may be executed in any order. Additionally, other steps and additional parameters could be added to the process while others may be removed without departing from the spirit of the invention.

Figure 5:
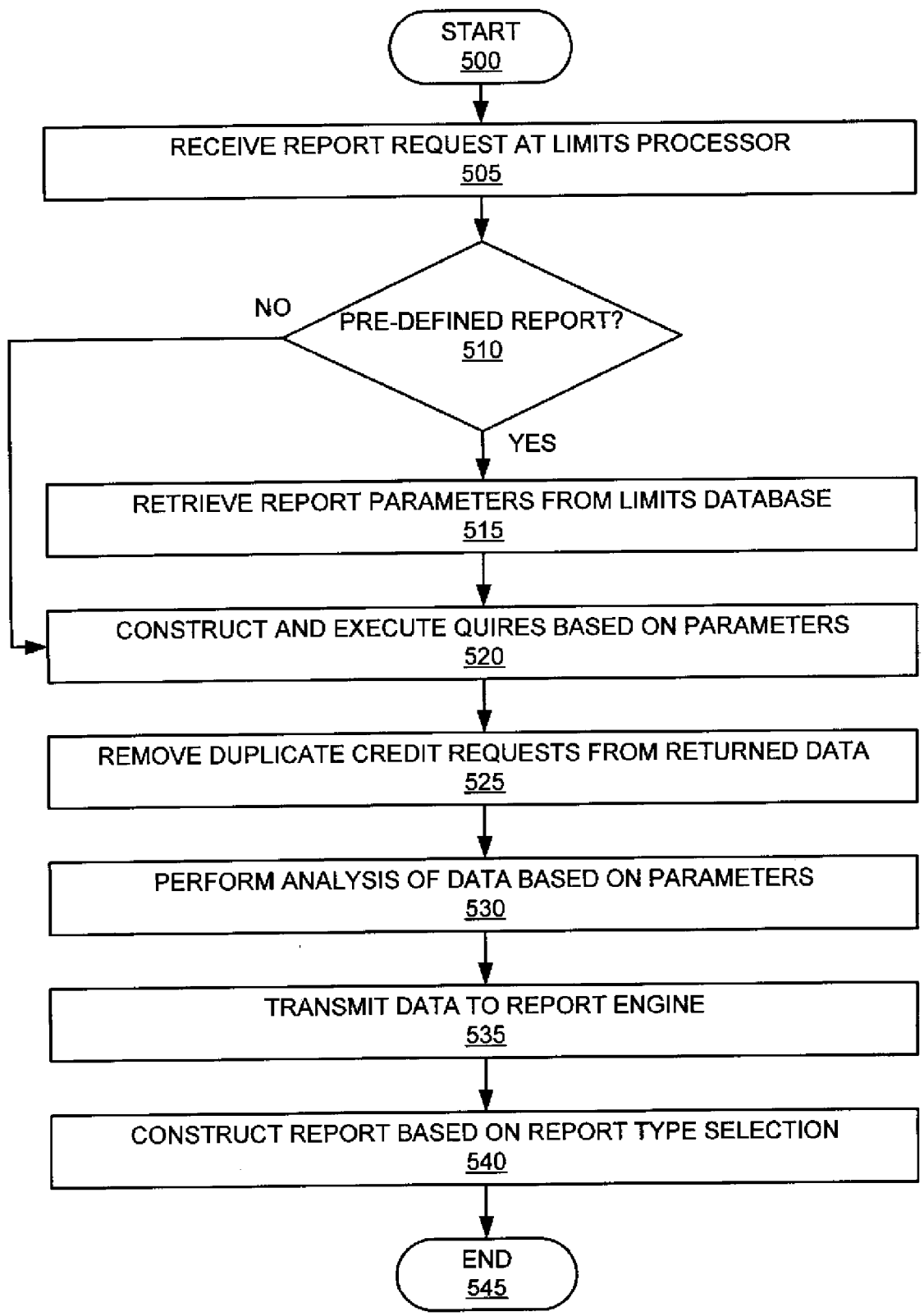
FIG. 5 is a flow chart illustrating a detailed view of an exemplary method for retrieving and processing cardmember decline information and compiling a limits report; and, FIG. 6 is a screenshot representing an exemplary limits report of the invention.

FIG. 5 is a flow chart illustrating a detailed view of an exemplary method for retrieving and processing cardmember decline information and constructing a limits report. Step 500 is a start state, which corresponds to the initiation of the execution of the limits report. A user request for a limits report may be received at a limits processor (step 505). If the request is accompanied by report parameters, then the parameters may have been defined prior to the report request indicating that the request is not for a predefined report (step 510). If, however, the request is not accompanied by parameter data, then the request may be for a predefined report (step 510) and limits processor 140 may retrieve the report parameters from a decline database (step 515). From the reports parameters, the limits processor 140 may construct one or more queries and issue them to the appropriate databases (step 520). Data received from one or more databases may be processed at the limits processor 140 where duplicate credit requests may be removed (step 525). Duplicate credit requests may result when a card is processed two or more times when it is believed that a hardware and/or software problem may be to blame for a declined transaction. Duplicate requests would likely result in an inaccurate analysis for the limits report therefore may be removed.

Declined transaction data representing one or more cardmembers 100 may be analyzed at the limits processor 140 prior to compiling the limits report. Analysis may be performed based on the parameters as defined in FIG. 4. Following analysis, the data may be transmitted to a report engine (step 535) where a limits report may be compiled (step 540) based on the type and/or format of report that user selected (FIG. 3, Step 340). When execution of the limits report is complete, then the limits report may be transmitted to the user and the process may be complete (step 545).

The steps as recited above and illustrated in FIG. 5 provide a sample process flow for an exemplary embodiment for constructing a limits report, practitioners will appreciate the steps may be executed in any order. Additionally, other steps and additional parameters could be added to the process while others may be removed without departing from the spirit of the invention.

Figure 6:
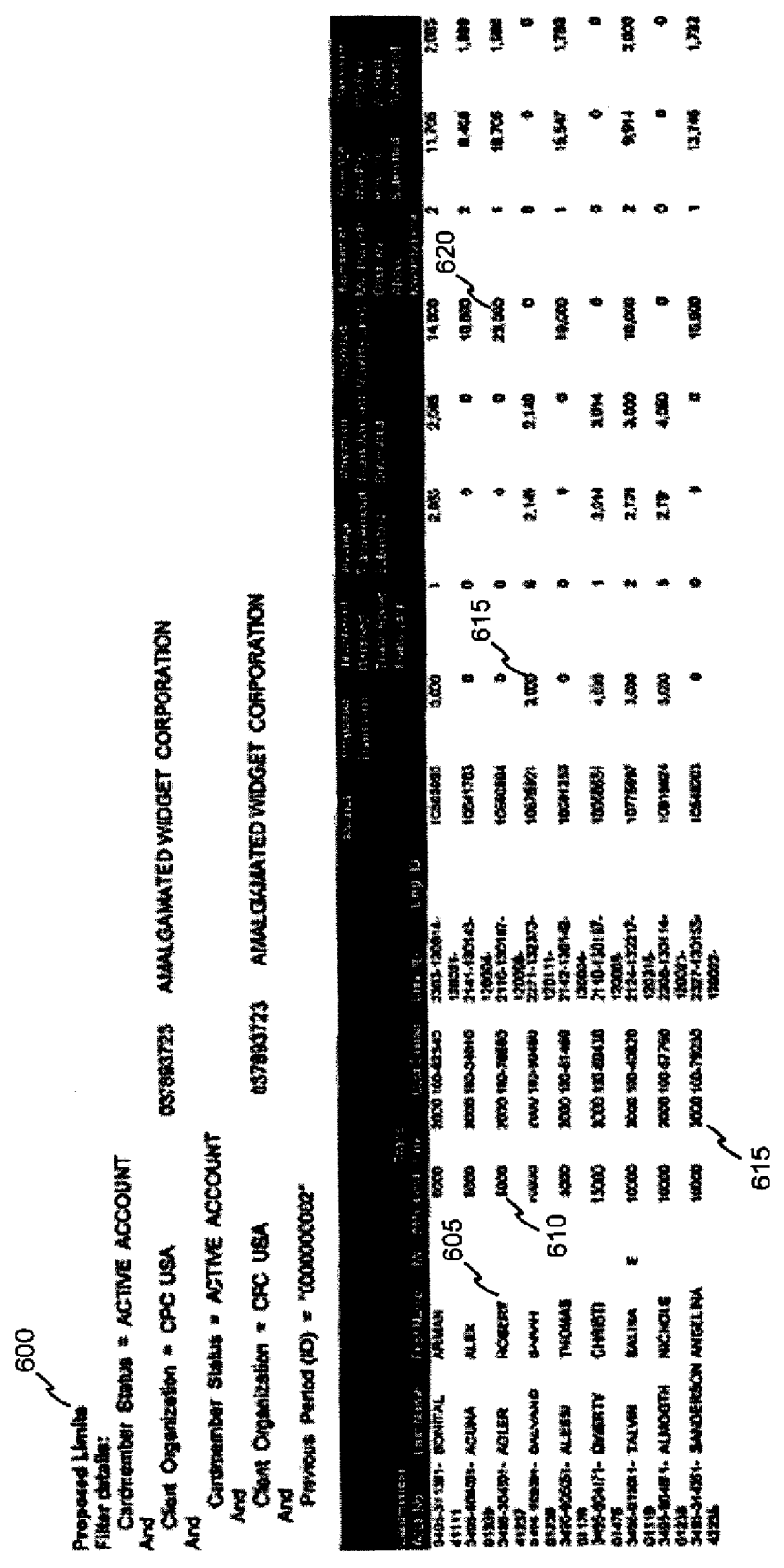

FIG. 6 is a screenshot representing an exemplary limits report of the invention. Proposed limits filter details 600 provide information regarding what parameters where applied when compiling the report. According to the report depicted in FIG. 6, the report was compiled based on cardmember status, client organization, cardmember status, an a period definition. A period definition may comprise a start and end date or any other measurement of time, (i.e. the previous 60 days) for transactions to be included in the report. Practitioners will appreciate that a limits report may compiled from any number of parameters.

A report may be compiled based on any number of cardmembers which are identified by account number and cardmember name 605. The report also provides a current monthly limit 610 and transaction limit 615 according to cardmember. The proposed transaction limit 620 is the recommended limit for individual credit transactions, while the proposed monthly limit 625 represents a recommended monthly limit for a cardmember transactions combined. The limits report contains a number of other data classifications previously discussed. Practitioners will appreciate that data classifications may be added or removed from the limits report without departing from the spirit of the invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. Further, no element described herein is required for the practice of the invention unless expressly described as "essential" or "critical".

It should be understood that the detailed description and specific examples, indicating exemplary embodiments of the present invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

What is claimed is:

1. A computer implemented method for determining a first transaction limit on a transaction account having an established second transaction limit, said method including:

retrieving transaction information for an existing account holder;

retrieving said first transaction limit for said existing account holder, wherein said first transaction limit is imposed by said existing account holder and is a further limitation upon said second transaction limit, wherein said second transaction limit is imposed by an account issuer and is based upon credit history and payment history;

analyzing maximum spend data and negative history data relating to said first transaction limit over a defined period of time, wherein said negative history data includes a number of cycles where said first transaction limit was exceeded, and an average sum of transactions exceeding said first transaction limit;

determining, based on said maximum spend and said negative history data, a recommendation for said existing account holder to decide whether to send an instruction to said account issuer to increase said first transaction limit in order to minimize authorization declines based on said first transaction limit associated with said transaction account;

sending said recommendation to said existing account holder;

receiving said instruction from said existing account holder to increase said first transaction limit in order to minimize authorization declines based on said first transaction limit associated with said transaction account; and, increasing said first transaction limit to reduce said negative history data relating to said first transaction limit.

2. The method of claim 1, further including producing at least one of a report and an analysis at a predetermined interval.

3. The method of claim 1, further including producing a report by: retrieving at least one parameter;
retrieving data from at least one database according to said at least one parameter;
removing duplicate entries from said data;
processing said data according to said parameter; and,
formatting said data according to said parameter.

4. The method of claim 3, wherein said retrieving at least one parameter includes retrieving said parameter from at least one of a user and a database.

5. The method of claim 3, wherein said processing step includes placing data in at least one category based upon said parameter.

6. The method of claim 3, wherein said processing step includes placing data in at least one category based upon said parameter and assigning at least one weighted value to said at least one category according to said parameter.

7. The method of claim 1, wherein said analyzing step further includes analyzing at least one of weighting factors, spend patterns, decline history, online charges, card present charges, amount of transaction, credit worthiness, repayment history, and good standing history.

8. The method of claim 1, wherein said existing account holder regularly exceeds a spending limit.

9. The method of claim 1, further including producing at least one of a report and an analysis at a predetermined interval, wherein said interval is based upon at least one of number of declines, subsequent time period, previous time period, transaction level, a request, and duplicate charge attempts.

10. The method of claim 1, further including automatically varying the first transaction limit by at least one of a pre-set amount and pre-set percentage.

11. The method of claim 1, further including notifying said existing account holder of reports.

12. The method of claim 1, wherein said existing account holder is associated with an account different from said transaction account.

13. The method of claim 1, wherein said step of analyzing includes analyzing transaction information of a group of account holders.

14. The method of claim 1, further including imposing a revised first transaction limit.

15. The method of claim 1, further including imposing a revised first transaction limit by at least one of said existing account holder, employer, program administrator and third party.

16. The method of claim 1, further including classifying declines by at least one of amount of transaction, frequency of decline and duplicate attempts.

17. A computer readable storage medium containing a set of instructions for a general purpose computer for determining a first transaction limit on a transaction account having an established second transaction limit, said instructions including:

retrieving transaction information for an existing account holder;

retrieving a first transaction limit for said existing account holder, wherein said first transaction limit is imposed by said existing account holder and is a further limitation upon a second transaction limit, wherein said second transaction limit is imposed by an account issuer and is based upon credit history and payment history;

analyzing a maximum spend data and negative history data relating to said first transaction limit over a defined period of time, wherein said negative history data includes a number of cycles where said first transaction limit was exceeded, and an average sum of transactions exceeding said first transaction limit;

determining, based on said maximum spend and said negative history data, a recommendation for said existing account holder to decide whether to send an instruction to said account issuer to increase said first transaction limit in order to minimize authorization declines based on said first transaction limit associated with said transaction account;

sending said recommendation to said existing account holder;

receiving said instruction from said existing account holder to increase said first transaction limit in order to minimize authorization declines based on said first transaction limit associated with said transaction account; and, increasing said first transaction limit to reduce said negative history data relating to said first transaction limit.

18. A method for receiving a recommendation related to a first transaction limit on a transaction account having an established second transaction limit, said method comprising:

receiving, by an existing account holder, a recommendation related to said first transaction limit, wherein said recommendation is determined by a host, wherein said host:

retrieves transaction information for said existing account holder;

retrieves a first transaction limit for said existing account holder, wherein said first transaction limit is imposed by said existing account holder and is a further limitation upon a second transaction limit, wherein said second transaction limit is imposed by an account issuer and is based upon credit history and payment history;

analyzes maximum spend data and negative history data relating to said first transaction limit over a defined period of time, wherein said negative history data includes a number of cycles where said first transaction limit was exceeded, and an average sum of transactions exceeding said first transaction limit;

determines, based on said maximum spend and said negative history data, a recommendation for said existing account holder to decide whether to send an instruction to said account issuer to increase said first transaction limit in order to minimize authorization declines based on said first transaction limit associated with said transaction account; and, sending said instruction from said existing account holder to increase said first transaction limit in order to minimize authorization declines based on said first transaction limit associated with said transaction account, wherein said instruction causes an increase in said first transaction limit to reduce said negative history data relating to said first transaction limit.

\* \* \* \* \*

UNITED STATES PATENT AND TRADEMARK OFFICE
CERTIFICATE OF CORRECTION

| | | |
|---|---|---|
| PATENT NO. | : 7,314,166 B2 | Page 1 of 1 |
| APPLICATION NO. | : 10/907477 | |
| DATED | : January 1, 2008 | |
| INVENTOR(S) | : Gordon Emory Anderson et al. | |

It is certified that error appears in the above-identified patent and that said Letters Patent is hereby corrected as shown below:

On the Title Page (60):

Please replace the paragraph under the heading "Related U.S. Application Data" with:

--Provisional application No. 60/521,676, filed on Jun. 16, 2004.--

Signed and Sealed this

Sixth Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 7,314,166 B2  
APPLICATION NO. : 10/907477  
DATED : January 1, 2008  
INVENTOR(S) : Gordon Emory Anderson et al.

Page 1 of 1

It is certified that error appears in the above-identified patent and that said Letters Patent is hereby corrected as shown below:

In the Specification

In Column 1 line 9, please delete "6" and insert therefor -- 16 --.

Signed and Sealed this  
Third Day of December, 2013

Margaret A. Focarino  
*Commissioner for Patents of the United States Patent and Trademark Office*